United States Patent [19]

Yamawaki et al.

[11] Patent Number: 5,688,616
[45] Date of Patent: Nov. 18, 1997

[54] NON-SINTERED NICKEL ELECTRODE WITH EXCELLENT OVER-DISCHARGE CHARACTERISTICS, AN ALKALINE STORAGE CELL HAVING THE NON-SINTERED NICKEL ELECTRODE, AND A MANUFACTURING METHOD OF THE NON-SINTERED NICKEL ELECTRODE

[75] Inventors: Akifumi Yamawaki; Shinsuke Nakahori, both of Naruto; Takeo Hamamatsu, Itano-gun; Yoshitaka Baba, Naruto, all of Japan

[73] Assignee: Sanyo Electric Co., Ltd., Moriguchi, Japan

[21] Appl. No.: 671,199

[22] Filed: Jun. 27, 1996

Related U.S. Application Data

[62] Division of Ser. No. 618,622, Mar. 20, 1996.

[30] Foreign Application Priority Data

Jul. 31, 1995 [JP] Japan ..................... 7-195096

[51] Int. Cl.⁶ ..................... H01M 4/04
[52] U.S. Cl. ................. 429/223; 429/218; 29/623.1
[58] Field of Search ..................... 429/218, 223, 429/224, 222, 229; 252/519, 521; 423/594; 29/623.1, 623.5

[56] References Cited

U.S. PATENT DOCUMENTS

| | | | |
|---|---|---|---|
| Re. 34,752 | 10/1994 | Oshitani et al. | 429/223 |
| 4,844,999 | 7/1989 | Oshitani et al. | 429/223 |
| 4,985,318 | 1/1991 | Oshitani et al. | 429/223 |
| 5,366,831 | 11/1994 | Watada et al. | |
| 5,393,616 | 2/1995 | Mori et al. | |
| 5,451,425 | 9/1995 | Ohta et al. | 429/212 |
| 5,466,543 | 11/1995 | Ikoma et al. | 429/59 |

FOREIGN PATENT DOCUMENTS

| | | |
|---|---|---|
| 0 353 837 | 7/1990 | European Pat. Off. . |
| 63-216268 | 9/1988 | Japan . |
| 1-200555 | 8/1989 | Japan . |
| WO-A-9419939 | 9/1994 | WIPO . |

*Primary Examiner*—M. Nuzzolillo
*Attorney, Agent, or Firm*—Armstrong,Westerman, Hattori,McLeland & Naughton

[57] ABSTRACT

A alkali storage cell includes a non-sintered type nickel electrode which includes a highly efficient nickel hydroxide active material and which causes no capacity decrease during an over-discharge operation. The nickel electrode contains an active material composed of nickel hydroxide, a solid solution of at least one of zinc, cadmium, magnesium, and calcium which are added to the nickel hydroxide, and cobalt compound layers which are formed over the surfaces of particles of the nickel hydroxide. The cobalt compound layers have an oxidation number of larger than 2 and a disordered crystal structure. Such an active material can be manufactured by mixing nickel hydroxide powder containing a solid solution of at least one of zinc, cadmium, magnesium, and calcium with either metallic cobalt or a cobalt compound, and subjecting the mixture to heat treatment in the presence of oxygen and alkali. Another production method is to precipitate a cobalt compound over the surfaces of the nickel hydroxide powder containing a solid solution of at least one of zinc, cadmium, magnesium, and calcium so as to form cobalt compound layers, before subjecting it to the heat treatment in the same conditions.

7 Claims, 10 Drawing Sheets

NON-SINTERED NICKEL ELECTRODE WITH EXCELLENT OVER-DISCHARGE CHARACTERISTICS, AN ALKALINE STORAGE CELL HAVING THE NON-SINTERED NICKEL ELECTRODE, AND A MANUFACTURING METHOD OF THE NON-SINTERED NICKEL ELECTRODE

This is a division of application Ser. No. 08/618,622 filed Mar. 20, 1996.

BACKGROUND OF THE INVENTION (1) Field of the Invention

The present invention relates to a non-sintered nickel electrode and a manufacturing method thereof, and further to an alkaline storage cell which includes the non-sintered nickel electrode.

(2) Related Art

Nickel electrodes for use in alkaline storage cells are classified into sintered type and non-sintered type.

A sintered type nickel electrode is manufactured by repeating the following two soaking operations: firstly a porous sintered nickel substrate used as an active material holder is soaked in a solution of an acid nickel salt, such as nickel nitrate, so as to fill the pores with nickel salt, and secondly the substrate is soaked in an alkali solution so as to convert the nickel salt into nickel hydroxide.

In contrast, a non-sintered type nickel electrode is manufactured by applying a nickel active material which is manufactured separately onto an electrode substrate. One well-known method of manufacturing such an electrode is to mix a nickel active material which is mainly composed of nickel hydroxide with a conductive agent, a binder, water, and the like into a paste, to apply this paste onto an electrode substrate such as a punching metal, and to dry the coated substrate. Another well-known method is to fill an electrode substrate which is made from an open pore metal or a sintered metallic fiber with a nickel active material slurry.

Of these two types, sintered type nickel electrodes have a disadvantage that the manufacturing process is complex since the soaking operations must be repeated several times to obtain a sufficient amount of active material. Another disadvantage is that the substrate has low porosity, which sets limits on the capacity of the electrode.

Non-sintered type nickel electrodes, on the other hand, are free from these drawbacks, while they are inferior to the sintered type nickel electrodes in the utilization factor of nickel hydroxide as an active material.

Through various studies on the utilization factor of active materials, it is now known that the addition of a highly conductive high-order cobalt compound to the active material used in a non-sintered nickel electrode leads to an improvement in efficiency.

For example, Japanese Laid-open Patent Application No. 1-200555 describes a technique of manufacturing highly-conductive high-order cobalt compound layers such as CoOOH and $Co_2O_3$, by forming cobalt hydroxide layers over the surfaces of nickel hydroxide active material particles and then subjecting the cobalt hydroxide layers to heat treatment in the presence of alkali.

The utilization factor of active materials can be improved by adding an active material containing a highly-conductive high-order cobalt compound to a nickel electrode because the high-order cobalt compound layers form a conductive network within the electrode.

However, such non-sintered nickel electrodes still have a drawback that their capacity is greatly decreased during an over-discharge operation.

SUMMARY OF THE INVENTION

A first object of the present invention is to provide a non-sintered type nickel electrode which has a high utilization factor of a nickel hydroxide active material and effectively restricts a capacity decrease during an over-discharge operation.

A second object of the present invention is to provide a manufacturing method of such a non-sintered type nickel electrode.

A third object of the present invention is to provide an alkali storage cell which includes such a non-sintered type nickel electrode.

The first object can be achieved by a non-sintered nickel electrode supplied with an active material containing nickel hydroxide, a cobalt compound, and at least one of zinc, cadmium, magnesium, and calcium. At least one of zinc, cadmium, magnesium, and calcium is added in a form of a solid solution to the nickel hydroxide, and the cobalt compound is formed into layers over surfaces of particles of the nickel hydroxide. The cobalt compound has an oxidation number of larger than 2 and a disordered crystal structure.

The third object can be achieved by using the above-constructed nickel electrode, an alkali electrolyte, a separator which is mainly composed of unwoven polyolefin resin fiber, and a negative electrode which is composed of a $MmNi_5$ system hydrogen-absorbing alloy as components of a cell.

In the nickel electrode which is constructed as explained above, the utilization factor of active materials is remarkably improved. This improvement results from the fact that the high-order cobalt compound which has an oxidation number of larger than 2 and a disordered crystal structure has an extremely high conductivity, so that a conductive network is formed in the electrode.

In the nickel electrode which is constructed as explained above, a capacity decrease to be caused by an over-discharging operation is also restrained. This restraint seems to result from the following:

In a conventional nickel active material having high-order cobalt compound layers on the surfaces, the cobalt compound penetrates into the particles of the nickel active material when the cell is being over-discharged. As a result, the amount of cobalt on the surfaces lessens, decreasing the conductive network function within the electrode, thereby decreasing the capacity of the cell.

In contrast, when a solid solution of a metal such as zinc, cadmium, magnesium, and calcium is added to nickel hydroxide powder, the metal works to restrain the penetration of the cobalt compound into the nickel hydroxide power, so that the reduction of the amount of cobalt on the surfaces is restrained when the cell is being over-discharged.

Furthermore, when at least one of these metals is added in the form of being liberated from the nickel hydroxide active material, the chargeability at a high temperature is improved because the oxygen generation potential during a charging operation is shifted to being noble.

There are two methods of manufacturing such an active material.

One method is to mix nickel hydroxide powder containing a solid solution of at least one of zinc, cadmium, magnesium, and calcium with either metallic cobalt or a cobalt compound, and to subject the mixture to heat treatment in the presence of oxygen and alkali. A preferable amount of the metallic cobalt and the cobalt compound is 5 mol % to 14 mol % to the nickel hydroxide. This method is much easier.

The other method is to precipitate a cobalt compound over the surfaces of the nickel hydroxide powder containing a solid solution of at least one of zinc, cadmium, magnesium, and calcium so as to form cobalt compound layers, before subjecting it to the heat treatment in the same conditions. This method allows the cobalt compound layers to be formed more uniformly.

In either method, a preferable concentration of the alkali aqueous solution in the alkali heat treatment would be 15% by weight to 40% by weight, and a preferable temperature of the alkali heat treatment would be 50° C. to 150° C.

In addition, the use of an alkali solution including lithium ions for the alkali heat treatment contributes to the restriction of the capacity decrease to be caused by an over-discharging operation.

Therefore, an alkali storage cell including the nickel electrode of the present invention has a high utilization factor of active materials and restricts a capacity decrease during an over-discharge operation. In other words, such a cell has a great industrial value because of its large capacity and operational stability.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

Embodiment 1

Figure 1:
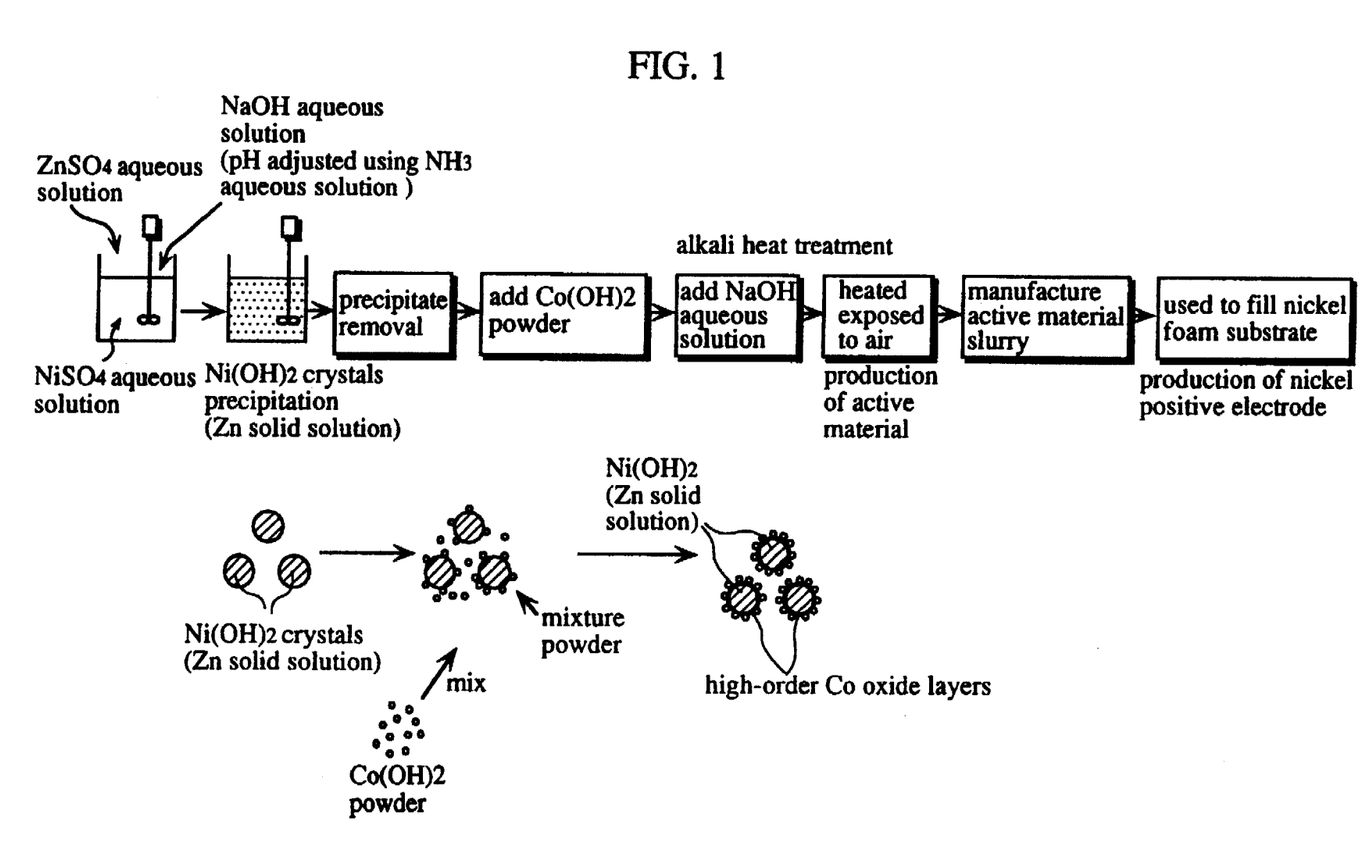
FIG. 1 shows the manufacture process of a nickel electrode of the first embodiment, and the state of nickel hydroxide particles in each stage of the manufacture process.

FIG. 1 shows the manufacture process of a nickel electrode of the present embodiment, and the state of nickel hydroxide particles in each stage of the manufacture process.

(Manufacture of a positive electrode)

A sodium hydroxide aqueous solution and a zinc sulfate aqueous solution were gradually added to a nickel sulfate aqueous solution whose specific gravity was about 1.33, with the pH being constantly adjusted using an ammonia aqueous solution, so as to precipitate nickel hydroxide in which zinc is added as a solid solution. The zinc sulfate aqueous solution was 2 mol % to the nickel sulfate aqueous solution.

As a result, nickel hydroxide powder in which 2 mol % of zinc was added as a solid solution was obtained. The ratio between nickel and zinc in the obtained nickel hydroxide powder in which 2 mol % of zinc is added as a solid solution could be measured with an ICP spectrometer by dissolving it in a hydrochloride aqueous solution.

Then, a commercially available cobalt hydroxide powder was added to and mixed with the obtained nickel hydroxide powder in which 2 mol % of zinc was added as a solid solution so as to manufacture a mixture powder. The amount of the cobalt hydroxide powder added was 10 mol % to the nickel hydroxide in the nickel hydroxide powder in which 2 mol % of zinc was added as a solid solution.

The mixture powder was then mixed with a 25% by weight sodium hydroxide aqueous solution, applied alkali heat treatment at a temperature of 100° C. in the air, washed in water, and dried. As a result, an active material a1 was obtained.

The alkali heat treatment was performed as follows.

While stirring the mixture powder in a beaker, the sodium hydroxide aqueous solution was added. While further stirring the mixture powder, it was heated for 0.5 hour. The amount of sodium hydroxide added was 5 parts by weight as a solid against 95 parts by weight of the mixture powder.

As another method of the alkali heat treatment, a sodium hydroxide aqueous solution may be applied to the mixture powder in the form of spray and then the mixture powder may be heated in the air.

During the alkali heat treatment, some of the cobalt hydroxide powder including cobalt whose oxidation number is 2 is converted into a cobalt compound whose oxidation is 3. As a result, a high-order cobalt compound whose average oxidation number is greater than 2 is manufactured, and adheres onto the surfaces of the nickel hydroxide particles.

Furthermore, some of the cobalt hydroxide dissolves in the sodium hydroxide aqueous solution and precipitates again during the alkali heat-treatment. As a result, high-order cobalt compound layers are formed onto the surfaces of the nickel hydroxide particles.

Therefore, the active material a1 consists of nickel hydroxide particles in which zinc is added as a solid solution and high-order cobalt compound layers which are formed over the surfaces of the nickel hydroxide particles.

Figure 2:
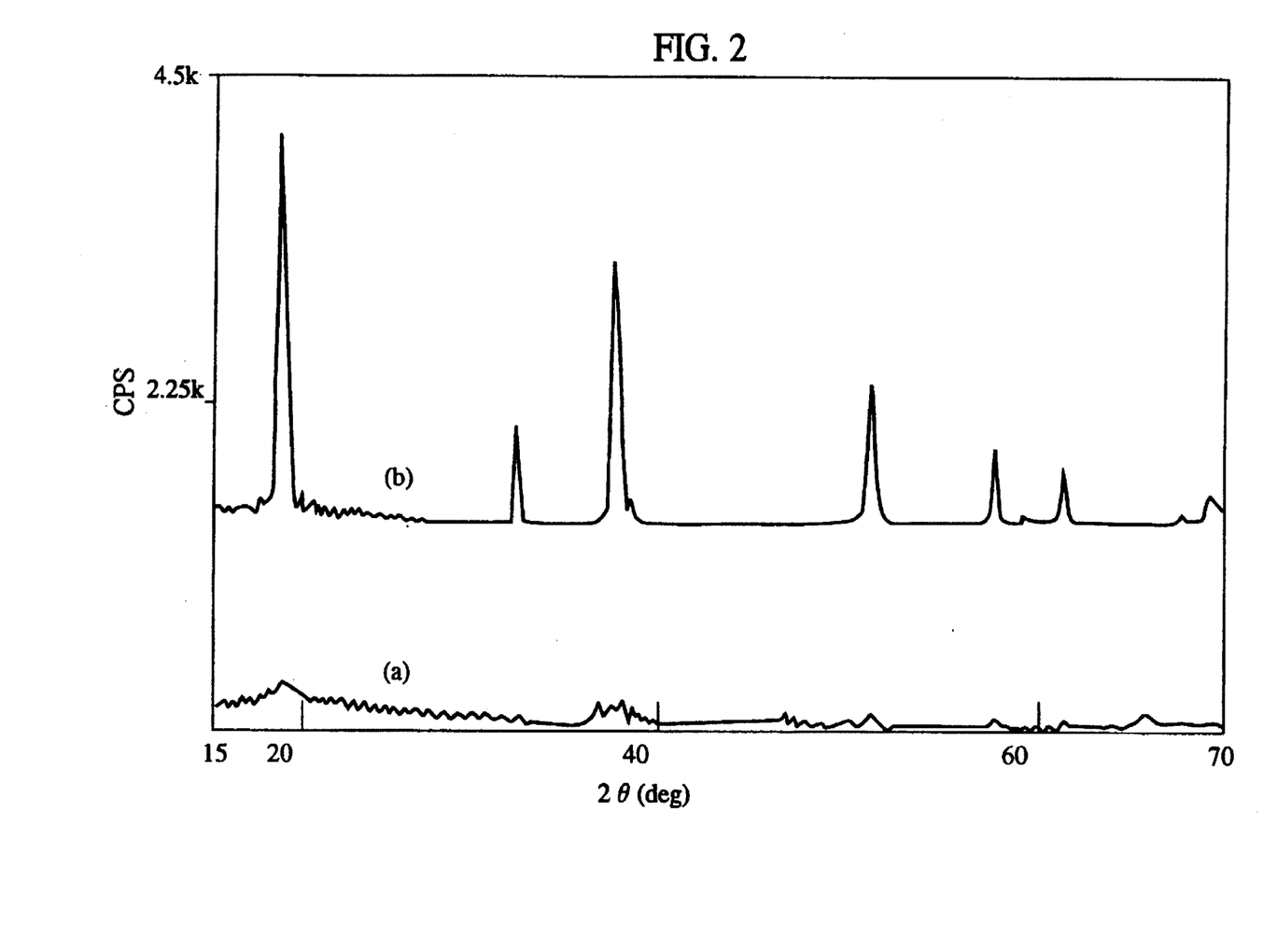
FIG. 2 shows an X-ray diffraction chart (a) of cobalt hydroxide which has been applied alkali heat treatment, and an X-ray diffraction chart (b) of cobalt hydroxide which has not been applied alkali heat treatment.

The high-order cobalt compound layers have a disordered crystal structure as shown in FIG. 2.

FIG. 2 shows an X-ray diffraction chart (a) of cobalt hydroxide which has been applied alkali heat treatment, and an X-ray diffraction chart (b) of cobalt hydroxide which has not been applied alkali heat treatment.

Most peaks including two outstanding peaks around 19 degrees and 38 degrees which are seen in the chart (b) are not seen in the chart (a). This indicates that the alkali heat treatment makes cobalt hydroxide be converted into a cobalt compound having a disordered crystal structure.

100 parts by weight of the active material a1 was mixed with 50 parts by weight of a 0.2% by weight methyl cellulose aqueous solution into a slurry. The slurry was used to fill foam nickel of thickness 1.6 mm and of a 95% porosity, before this was dried and rolled so as to manufacture a nickel electrode A1 of thickness 0.6 mm.
(Manufacture of a negative electrode)

Misch metal (a mixture of rare earth elements), nickel, cobalt, aluminum, and manganese were mixed at a ratio of 1.0:3.6:0.6:0.2:0.6, with this mixture then being melted into an alloy in an argon gas atmosphere in a harmonic induction furnace. This molten alloy was then cooled so as to manufacture a hydrogen-absorbing alloy ingot expressed by the formation equation $Mm_{1.0}Ni_{3.6}Co_{0.6}Al_{0.2}Mn_{0.6}$. This ingot was then pulverized into hydrogen-absorbing alloy powder whose average particle diameter is 100 µm.

This hydrogen-absorbing alloy powder was then mixed with a binder such as a polyethylene oxide and an appropriate amount of water into a hydrogen-absorbing alloy paste. This paste was applied onto both sides of a punching metal, dried, and rolled into a hydrogen-absorbing alloy electrode with a thickness of 0.4 mm.
(Assembly of an alkali storage cell)

The nickel electrode A1, the hydrogen-absorbing alloy electrode, and a separator which was mainly composed of an unwoven polyolefin resin fiber were cut into respective predetermined lengths. The nickel electrode A1 and the hydrogen absorbing alloy electrode were stacked with separator therebetween, rolled up, and inserted into an outer casing into which alkali electrolyte (a potassium hydroxide aqueous solution of 7N to 8.5N) was poured. As a result, a nickel-hydrogen storage cell was manufactured, which is hereinafter referred to as cell (A1).

It should be noted here that the nominal capacity of the cell (A1) is 1200 mAh, which is set by the positive electrode, and the capacity of the negative electrode is set around 1.5 times that figure.

Cells (A2)–(A7) were manufactured by using nickel electrodes A2–A7, respectively, in the same manner as the cell (A1).

The nickel electrodes A2–A7 contain active materials a2–a7, respectively, which were manufactured by partially modifying the formula of the active material a1 as follows:

The active material a2 was manufactured in the same manner as the active material a1 except that a cadmium sulfate aqueous solution was used in place of the zinc sulfate aqueous solution so as to manufacture nickel hydroxide powder with a 2 mol % cadmium solid solution instead of the nickel hydroxide powder in which 2 mol % of zinc was added as a solid solution. The active material a2 is composed of nickel hydroxide powder in which cadmium is added as a solid solution and high-order cobalt compound layers which are formed onto the surfaces of the nickel hydroxide powder.

The active material a3 was manufactured in the same manner as the active material a1 except that a magnesium nitrate aqueous solution was used in place of the zinc sulfate aqueous solution so as to manufacture nickel hydroxide powder in which 2 mol % of magnesium was added as a solid solution instead of the nickel hydroxide powder in which 2 mol % of zinc was added as a solid solution. The active material a3 is composed of nickel hydroxide powder in which magnesium is added as a solid solution and high-order cobalt compound layers which are formed onto the surfaces of the nickel hydroxide powder.

The active material a4 was manufactured in the same manner as the active material a1 except that a calcium nitrate aqueous solution was used in place of the zinc sulfate aqueous solution so as to manufacture nickel hydroxide powder in which 2 mol % of calcium was added as a solid solution instead of the nickel hydroxide powder in which 2 mol % of zinc was added as a solid solution. The active material a4 is composed of nickel hydroxide powder in which calcium is added as a solid solution and high-order cobalt compound layers which are formed onto the surfaces of the nickel hydroxide powder.

The active material a5 was manufactured in the same manner as the active material a1 except that a 1 mol % zinc sulfate aqueous solution and a 1 mol % cadmium sulfate aqueous solution were used in place of the 2 mol % zinc sulfate aqueous solution so as to manufacture nickel hydroxide powder in which 1 mol % of zinc and 1 mol % of cadmium were added as a solid solution instead of the nickel hydroxide powder in which 2 mol % of zinc was added as a solid solution. The active material a5 is composed of nickel hydroxide powder in which zinc and cadmium are added as a solid solution and high-order cobalt compound layers which are formed onto the surfaces of the nickel hydroxide powder.

The active material a6 was manufactured in the same manner as the active material a1 except that 10 mol % metallic cobalt powder was added in place of the cobalt hydroxide powder to the nickel hydroxide powder. The active material a6 is composed of nickel hydroxide powder in which zinc is added as a solid solution and high-order cobalt compound layers which are formed onto the surfaces of the nickel hydroxide powder.

The active material a7 was manufactured in the same manner as the active material a1 except that a mixture solution of sodium hydroxide and lithium hydroxide at a mole ratio of 9:1 was added in place of the 25% by weight sodium hydroxide to the mixture powder. The mixture solution has the same number of moles as the 25% by weight sodium hydroxide.

The active material a7, like the active material a1, is composed of nickel hydroxide powder in which zinc is added as a solid solution and high-order cobalt compound layers which are formed onto the surfaces of the nickel hydroxide powder. In the alkali heat treatment of the active material a7, however, the alkali solution contained lithium ions.

Embodiment 2

Figure 3:
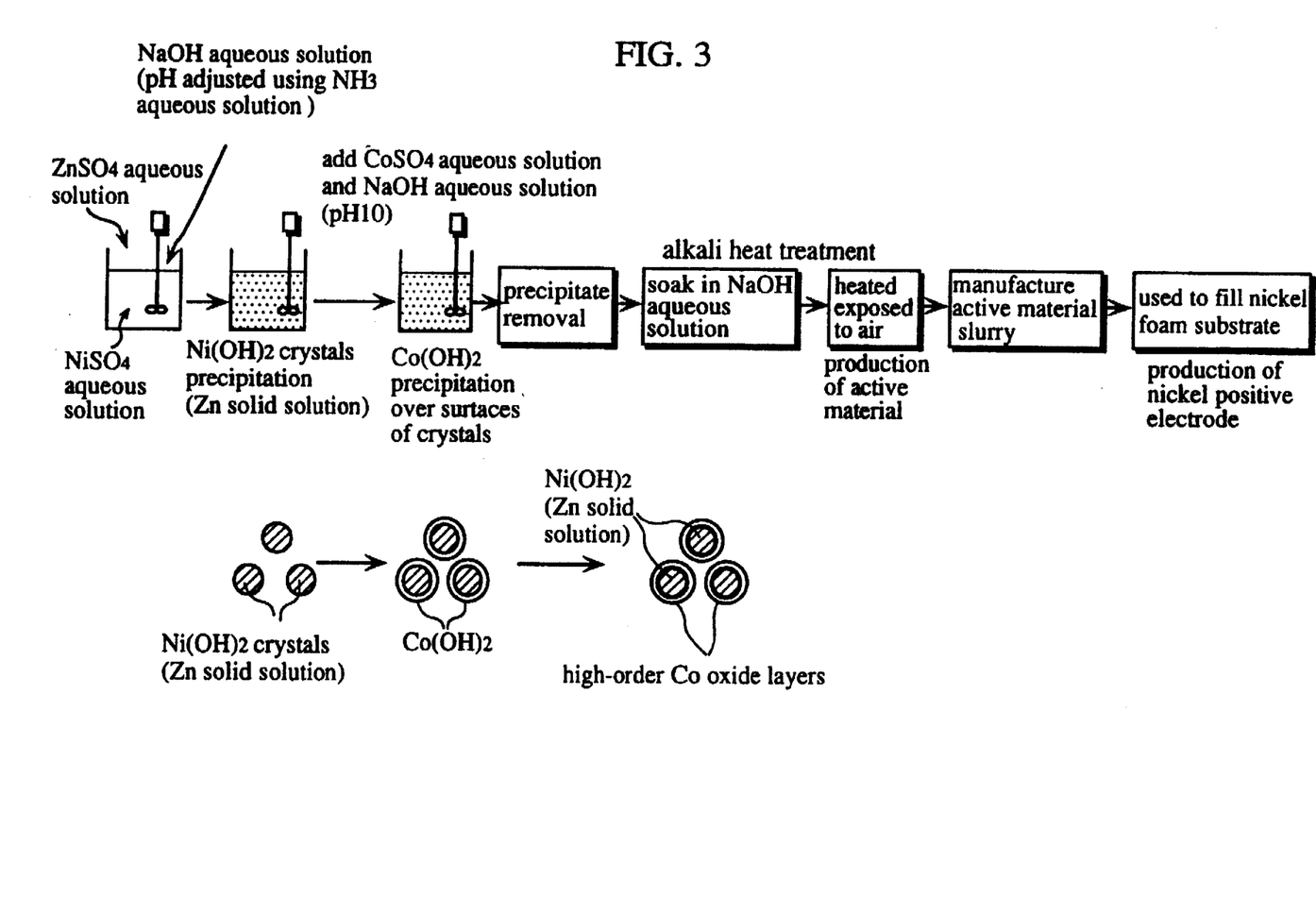
FIG. 3 shows the manufacture process of nickel electrodes of the second embodiment, and the state of nickel hydroxide particles in each stage of the manufacture process.

FIG. 3 shows the manufacture process of nickel electrodes of the present embodiment, and the state of nickel hydroxide particles in each stage of the manufacture process.
(Manufacture of a positive electrode)

Nickel hydroxide in which 2 mol % of zinc was added as a solid solution was precipitated in the same manner as in the first embodiment. The solution which contains nickel hydroxide powder in which 2 mol % of zinc was added as a solid solution was mixed with a cobalt sulfate aqueous solution and a sodium hydroxide aqueous solution while keeping the pH at 10. As a result, cobalt compound layers were formed onto the surfaces of the nickel hydroxide powder.

It should be noted here that the cobalt compound layers were made 10 mol % by adjusting the amount of the cobalt sulfate aqueous solution.

The mixture powder of nickel hydroxide, a zinc solid solution, and cobalt compound were taken, washed in water, and dried.

An active material b1 was manufactured by mixing the mixture powder with a 25% by weight sodium hydroxide aqueous solution, and subjecting it to alkali heat treatment in the same conditions as the first embodiment.

Since most of the cobalt compound layers are converted into high-order cobalt compounds during the alkali heat treatment, high-order cobalt compound layers are formed over the surfaces of the nickel hydroxide powder.

The active material b1 thus manufactured is, like the active material a1, composed of nickel hydroxide powder in which zinc is added as a solid solution and high-order cobalt compound layers which are formed over the surfaces of the nickel hydroxide powder. It is believed, however, that the high-order cobalt compound layers of the active material b1 are more uniform.

The ratio among nickel, zinc, and cobalt in the obtained mixture powder could be measured with an ICP spectrometer by dissolving it in a hydrochloride aqueous solution.

A nickel electrode B1 was manufactured by using the active material b1, in the same formula as the nickel electrode A1 of the first embodiment.
(Assembly of an alkali storage cell)

A cell (B1) was manufactured by using a nickel electrode B1, in the same manner as the cell (A1) of the first embodiment.

Cells (B2)–(B5) were manufactured by using nickel electrodes B2–B5, respectively, in the same manner as the cell (B1).

The nickel electrodes B2–B5 contain active materials b2–b5, respectively, which were manufactured by partially modifying the formula of the active material b1 as follows:

The active material b2 was manufactured in the same manner as the active material b1 except that a cadmium sulfate aqueous solution was used in place of the zinc sulfate aqueous solution so as to manufacture nickel hydroxide powder in which 2 mol % of cadmium was added as a solid solution instead of the nickel hydroxide powder in which 2 mol % of zinc was added as a solid solution. The active material b2 is composed of nickel hydroxide powder in which cadmium is added as a solid solution and high-order cobalt compound layers which are formed onto the surfaces of the nickel hydroxide powder.

The active material b3 was manufactured in the same manner as the active material b1 except that a magnesium nitrate aqueous solution was used in place of the zinc sulfate aqueous solution so as to manufacture nickel hydroxide powder with a 2 mol % magnesium solid solution instead of the nickel hydroxide powder in which 2 mol % of zinc was added as a solid solution. The active material b3 is composed of nickel hydroxide powder in which magnesium is added as a solid solution and high-order cobalt compound layers which are formed onto the surfaces of the nickel hydroxide powder.

The active material b4 was manufactured in the same manner as the active material b1 except that a calcium nitrate aqueous solution was used in place of the zinc sulfate aqueous solution so as to manufacture nickel hydroxide powder with a 2 mol % calcium solid solution instead of the nickel hydroxide powder in which 2 mol % of zinc was added as a solid solution. The active material b4 is composed of nickel hydroxide powder in which calcium is added as a solid solution and high-order cobalt compound layers which are formed onto the surfaces of the nickel hydroxide powder.

The active material b5 was manufactured in the same manner as the active material b1 except that a 1 mol % zinc sulfate aqueous solution and a 1 mol % cadmium sulfate aqueous solution were used in place of the 2 mol % zinc sulfate aqueous solution so as to manufacture nickel hydroxide powder in which 1 mol % of zinc and 1 mol % of cadmium were added as a solid solution instead of the nickel hydroxide powder in which 2 mol % of zinc was added as a solid solution. The active material b5 composed of nickel hydroxide powder in which zinc and cadmium were added as a solid solution and high-order cobalt compound layers which are formed onto the surfaces of the nickel hydroxide powder.

Embodiment 3

An active material a8 was manufactured by mixing 100 parts by weight of the active material a1 of the first embodiment with 4 parts by weight of zinc oxide. Then, a nickel electrode. A8 was procured in the same manner as the nickel electrode A1, by using the active material a8, and a cell (A8) was manufactured in the same manner as (A1), by using the nickel electrode A8.

An active material a9 was manufactured in the same manner as the active material a1 except that a 6 mol % zinc sulfate aqueous solution in place of the 2 mol % zinc sulfate aqueous solution was added to the nickel sulfate aqueous solution so as to manufacture nickel hydroxide powder in which 6 mol % of zinc was added as a solid solution. Then, a nickel electrode A9 was procured in the same manner as the nickel electrode A1, by using the active material a9, and a cell (A9) was manufactured in the same manner as (A1), by using the nickel electrode A9.

An active material b6 was manufactured by mixing 100 parts by weight of the active material b1 of the second embodiment with 4 parts by weight of zinc oxide. Then, a nickel electrode B6 was procured in the same manner as the nickel electrode B1, by using the active material b6, and a cell (B6) was manufactured in the same manner as (B1), by using the nickel electrode B6.

An active material b7 was manufactured in the same manner as the active material b1 of the second embodiment except that a 6 mol % zinc sulfate aqueous solution in place of the 2 mol % zinc sulfate aqueous solution was added to the nickel sulfate aqueous solution so as to manufacture nickel hydroxide powder in which 6 mol % of zinc was added as a solid solution. Then, a nickel electrode B7 was procured in the same manner as the nickel electrode B1, by using the active material b7, and a cell (B7) was manufactured in the same manner as (B1), by using the nickel electrode B7.

A comparison between the active material a8 and the active material a9 indicates that both materials contain approximately the same amount of zinc. However, some zinc is added in the form of a solid solution in the nickel hydroxide powder and some zinc is in the state of being liberated therefrom in the active material a8, whereas all zinc is added in the form of a solid solution in the nickel hydroxide powder in the active material a9.

A comparison between the active material b6 and the active material b7 indicates the same relationship.

Comparative Example 1

In the present comparative example, no solid solution is added to nickel hydroxide powder in the production of active materials. Comparative cells (C1), (C6), (D1), and (D6) were manufactured as follows.

The cell (C1) was manufactured in the same manner as the cell (A1) of the first embodiment except that no zinc sulfate was added to the nickel sulfate aqueous solution in the production of the active material a1. The cell (C1) has the same structure as the cell (A1) except that the nickel active material has no zinc added as a solid solution.

The cell (C6) was manufactured in the same manner as the cell (A1) except that zinc oxide was added to nickel sulfate in the state of being liberated therefrom, instead of adding the zinc sulfate aqueous solution to the nickel sulfate aqueous solution in the production of the active material a1. The zinc oxide was 2 wt % of the nickel sulfate. The cell (C6) has the same structure as the cell (A1) except that the nickel active material has zinc oxide liberated from nickel hydroxide, not a solid solution.

The cell (D1) was manufactured the Same manner as the cell (B1) of the second embodiment except that no zinc oxide was added to the nickel sulfate aqueous solution in the production of the active material b1. The cell (D1) has the same structure as the cell (B1) except that the nickel active material has no zinc solid solution.

The cell (D6) was manufactured in the same manner as the cell (B1) of the second embodiment except that zinc oxide was added to nickel sulfate in the state of being liberated therefrom, instead of adding the zinc sulfate aqueous solution to the nickel sulfate aqueous solution in the production of the active material b1. The zinc oxide was 2 wt % of the nickel sulfate. The cell (D6) has the same structure as the cell (B1) except that the nickel active material has zinc oxide liberated from nickel hydroxide, not a solid solution.

Comparative Example 2

The present comparative example deals with modifications of the alkali heat treatment.

Comparative active materials c2–c5 and d2, and comparative nickel electrodes C2–C5 and D2 were manufactured as follows.

The active material c2 was manufactured in the same manner as the active material a1 of the first embodiment except that when the mixture powder was heated at the temperature of 100° C. in the air, no sodium hydroxide aqueous solution was added to the mixture powder. In other words, the mixture powder was applied heat treatment without alkali. Then, the nickel electrode C2 was manufactured in the same manner as the nickel electrode A1, by using the active material c2.

The active material c3 was manufactured in the same manner as the active material a1 except that the mixture powder was applied oxidation treatment with $H_2O_2$ instead of the alkali heat treatment. Then, the nickel electrode C3 was manufactured in the same manner as the nickel electrode A1, by using the active material c3.

The active material c4 was manufactured in the same manner as the active material a1 except that the alkali heat treatment was applied to the cobalt hydroxide powder mixed with a 25% sodium hydroxide aqueous solution at the temperature of 100° C. in the air, and then it was mixed with nickel hydroxide powder in which zinc was added as a solid solution. Then, the nickel electrode C4 was manufactured in the same manner as the nickel electrode A1, by using the active material c4.

The active material c5 was manufactured in the same manner as the active material a1 except that no alkali heat treatment was applied to the mixture powder. Then, the nickel electrode C5 was manufactured in the same manner as the nickel electrode A1, by using the active material c5.

The active material d2 was manufactured in the same manner as the active material b1 of the second embodiment except that when the mixture powder was heated at the temperature of 100° C. in the air, no sodium hydroxide aqueous solution was added. In other words, the mixture powder was applied heat treatment without alkali. Then, the nickel electrode D2 was manufactured in the same manner as the nickel electrode B1, by using the active material d2.

EXPERIMENTS

The following seven experiments were conducted with the nickel electrodes and cells of the first, second, and third embodiments and comparative examples 1 and 2.

Experiment 1

(over-discharge characteristics)

The over-discharge characteristics of the cells (A1)–(A7) of the first embodiment, the cells (B1)–(B5) of the second embodiment, and the cells (C1), (C6), (D1), and (D6) of the comparative example 1 were measured.

The measurement was carried out under the following conditions. A charging operation was started at a current of 1 C (1200 mA) at a room temperature and suspended for an hour when the value of $-\Delta V$ reached 10 mV. The value indicates the amount of voltage which dropped from the maximum charging voltage. Then, a discharging operation was started at a current of 1 C, and terminated when the discharge termination voltage of 1 V was attained. After the discharging operation, a forcibly discharging operation was carried out for 16 hours at a current of 0.05 C (60 mA).

While the process was repeated for cycles, the discharge capacity after the first cycle and the discharge capacity after the fifth cycle were measured. The discharge capacity after the fifth cycle is shown as a percentage of the discharge capacity after the first cycle of each cell in Table 1.

TABLE 1

| CELLS | SOLID SOLUTIONS | ADDITIVES TO NiOH | DISCHARGE CAPACITY (%) |
|---|---|---|---|
| (A₁) | Zn | Co(OH)₂ powder | 91.2 |
| (A₂) | Cd | Co(OH)₂ powder | 92.3 |
| (A₃) | Mg | Co(OH)₂ powder | 90.4 |
| (A₄) | Ca | Co(OH)₂ powder | 88.6 |
| (A₅) | Zn + Cd | Co(OH)₂ powder | 91.0 |
| (A₆) | Zn | Co powder | 92.1 |
| (A₇) | Zn | Co(OH)₂ powder | 94.9 |
| (B₁) | Zn | cobalt sulfate + NaOH | 91.4 |
| (B₂) | Cd | cobalt sulfate + NaOH | 92.2 |
| (B₃) | Mg | cobalt sulfate + NaOH | 90.0 |
| (B₄) | Ca | cobalt sulfate + NaOH | 87.4 |
| (B₅) | Zn + Cd | cobalt sulfate + NaOH | 90.7 |
| (C₁) | none | Co(OH)₂ powder | 77.3 |
| (D₁) | none | cobalt sulfate + NaOH | 77.8 |
| (C₆) | none (liberalized Zn) | Co(OH)₂ powder | 80.5 |
| (D₆) | none (liberalized Zn) | cobalt sulfate + NaOH | 80.7 |

Table 1 indicates that the cells (A1)–(A7) of the first embodiment and the cells (B1)–(B5) of the second embodiment, and especially the cell (A7) exhibited higher discharge capacity than the cells (C1), (D1), (C6), and (C6) of the comparative example 1.

The results indicate that it is important to add zinc, cadmium, magnesium, or calcium to the nickel active material in the form of a solid solution in order to restrain a capacity decrease which is caused by an over-discharging operation. If they are added in the form of being liberated from the nickel hydroxide powder, they do not effectively function for the restriction.

The results further indicate that the use of an alkali solution including lithium ions for the alkali heat treatment also contributes to the restriction of the capacity decrease to be caused by an over-discharging operation.

Experiment 2

(the relationship between the presence of alkali heat treatment and the utilization factor of active materials)

Electrodes each having a theoretical capacity of 1200 mAh were manufactured by using the active materials a1 and b1 of the embodiments 1 and 2, and the active materials c2–c5 and d2 of the comparative example 2, and the utilization factor of these active materials were measured. The measurement was carried out as follows.

A simple open cell was manufactured for each nickel electrode by using a nickel plate as the opposing electrode, and a 25% by weight potassium hydroxide aqueous solution.

The simple open cell was charged for 24 hours at a current of 120 mA, discharged at a current of 400 mA until the discharge termination voltage of −0.8 V was reached at the nickel plate. The discharge capacity at this moment was measured and the utilization factor of the active material was calculated according to the equation 1 below.

$$\text{utilization factor of active material} = \frac{\text{measured discharge capacity}}{1200} \times 100$$

The calculation results are shown with the features of these nickel electrodes in Table 2.

TABLE 2

| ELECTRODES | FEATURES OF TREATMENTS | UTILIZATION FACTOR OF ACTIVE MATERIAL |
|---|---|---|
| $A_1$ | apply alkali heat treatment to mixture powder | 92.9 |
| $B_1$ | apply alkali heat treatment to Ni(OH)$_2$ having cobalt compound layers | 93.4 |
| $C_2$ | apply heat treatment to mixture powder without alkali | 69.8 |
| $C_3$ | apply oxidation treatment to mixture powder with H$_2$O$_2$ | 71.2 |
| $C_4$ | apply alkali heat treatment to Co(OH)$_2$ and mix it with Ni(OH)$_2$ | 68.3 |
| $C_5$ | apply no oxidation treatment to mixture powder | 84.2 |
| $D_2$ | apply no oxidation treatment to Ni(OH)$_2$ having cobalt compound layers | 86.4 |

Table 2 indicates that the nickel electrodes A1 and B1 exhibited remarkably high utilization factor of the active materials as compared with the nickel electrodes C2–C5 and D2.

It is believed that the low utilization factor of the active materials in the electrodes C2–C4 is due to the unsuccessful formation of the high-order cobalt compound layers over the surfaces of the nickel hydroxide particles in the manufacture of the electrodes C2–C4. The results indicate that it is important for the improvement of the utilization factor of the active materials to form the high-order cobalt compound layers through alkali heat treatment.

The utilization factor of the active materials in the nickel electrodes C2–C4 is still lower than that of the nickel electrodes C5 and D2.

It is believed that the low utilization factor of the active materials in the electrodes C2–C4 was resulted from the high-order cobalt compound layers formed have poor conductivity because oxidation was conducted in the absence of alkali.

Experiment 3

(the relationship between the amount of cobalt hydroxide to be added and the capacity per unit active material)

Using the same manufacturing formula as the active material a1 of the first embodiment, five different active materials were manufactured varying the amount of cobalt hydroxide powder to be added to the nickel hydroxide powder. Then, five different nickel electrodes were manufactured by using these active materials, respectively. Then, the discharge capacity of each electrode was measured in the same manner as in the second experiment, and the capacity per unit active material of each electrode was calculated according to the following equation 2.

$$\frac{\text{capacity per unit active material}} = \frac{\text{measured discharged capacity}}{\text{active material in nickel electrode}}$$

Figure 4:
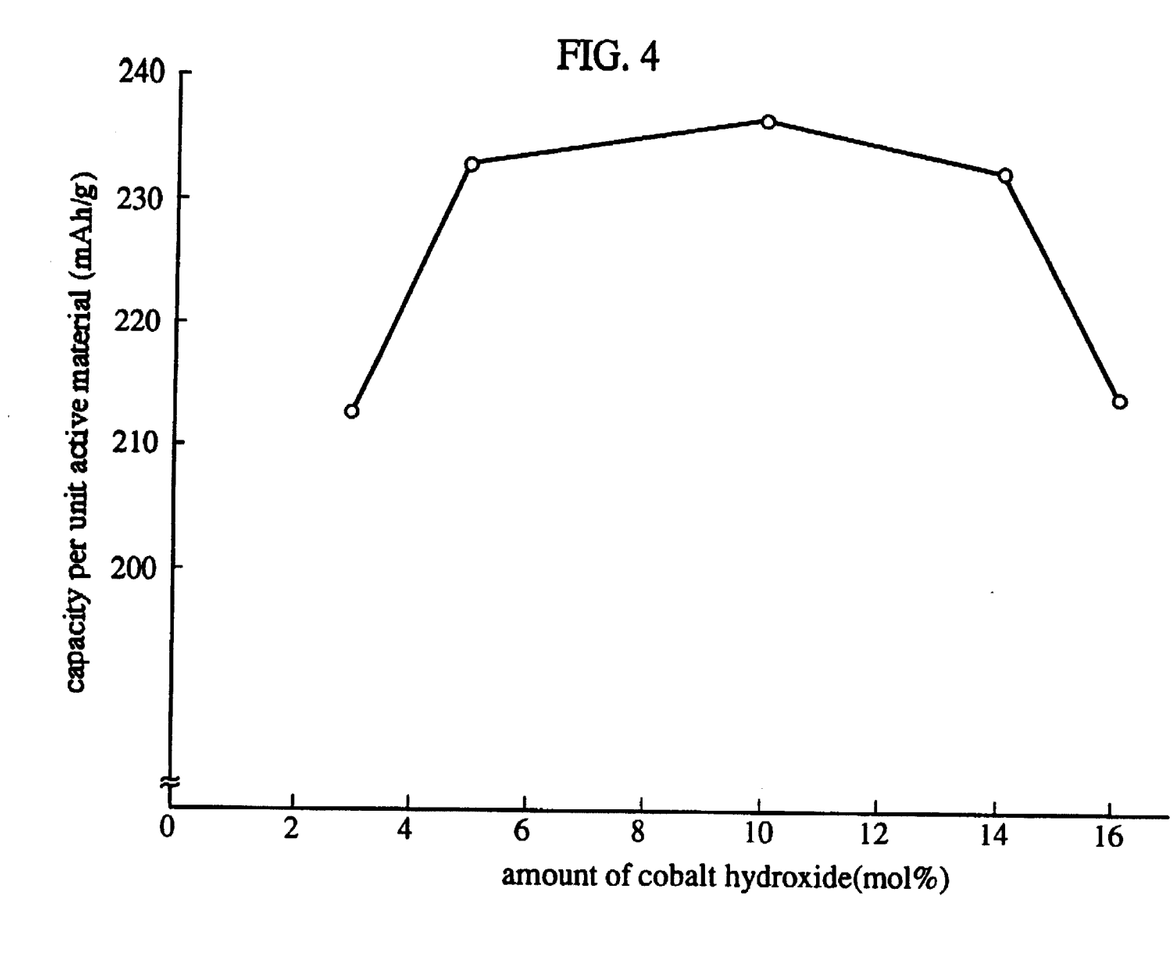
FIG. 4 is a graph showing the results of the third experiment: the relationship between the amount of cobalt hydroxide powder to be added and the capacity per unit active material.

The calculated results are shown in Table 3 and FIG. 4.

TABLE 3

| COBALT COMPOUNDS (mol %) | CAPACITY OF PER UNIT ACTIVE MATERIAL (mAh/g) |
|---|---|
| 3 | 212.5 |
| 5 | 233.2 |
| 10 | 236.9 |
| 14 | 232.8 |
| 16 | 214.2 |

Table 3 and FIG. 4 indicate that when the mixture powder consisting of nickel hydroxide powder and cobalt hydroxide powder is applied alkali heat treatment, a preferable amounts of the cobalt hydroxide powder is 5 mol % to 14 mol %.

It is believed that when the cobalt hydroxide powder is less than 5 mol %, the high-order cobalt compound layers are not formed successfully due to the lack of the cobalt hydroxide, whereas when the amount exceeds 14 mol %, the small ratio of the nickel hydroxide to the active material has a more effect on the capacity than on the formation of the high-order cobalt compound layers.

It is believed that when metallic cobalt powder is added in place of the cobalt hydroxide powder, its preferable amount is also 5 mol % to 14 mol %.

Using the same manufacturing formula as the active material b1 of the second embodiment, six different active materials were manufactured by varying the amount of the cobalt sulfate salt aqueous solution, thereby varying the amount of cobalt hydroxide to be precipitated over the surfaces of the nickel hydroxide particles. Then, six different nickel electrodes were manufactured by using these active materials, respectively. Then, the capacity per unit active material of each electrode was calculated according to the equation 2. The calculated results are shown in Table 4 and FIG. 5.

TABLE 4

| COBALT COMPOUNDS (mol %) | CAPACITY OF PER UNIT ACTIVE MATERIAL (mAh/g) |
|---|---|
| 2 | 223.2 |
| 3 | 230.5 |
| 5 | 238.2 |
| 10 | 242.4 |
| 14 | 234.2 |
| 16 | 218.2 |

Figure 5:
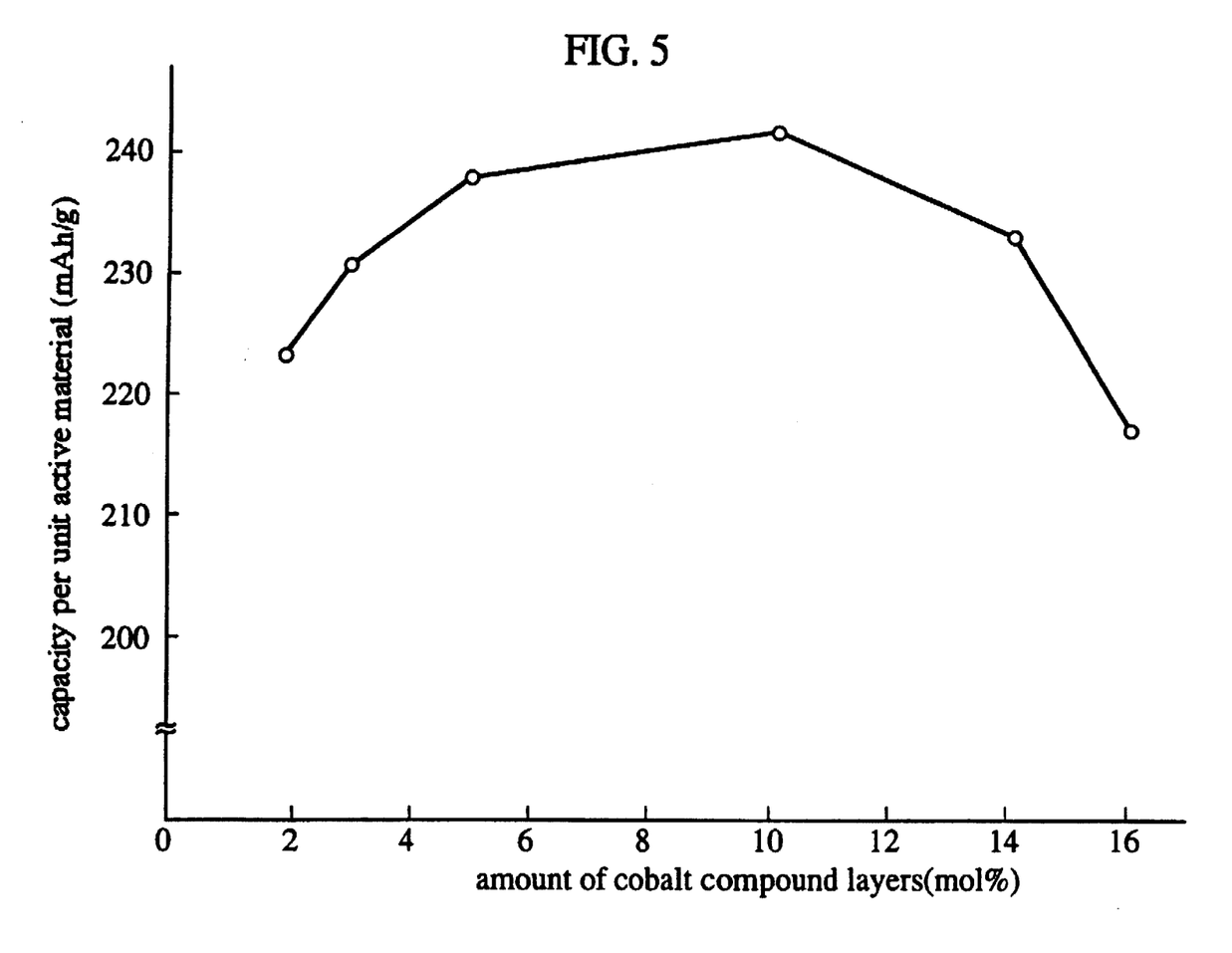
FIG. 5 is a graph showing the results of the third experiment: the relationship between the amount of cobalt compound layers and the capacity per unit active material.

Table 4 and FIG. 5 indicate that when the nickel hydroxide powder having cobalt hydroxide layers on their surfaces are applied alkali heat treatment like in the second embodiment, the preferable amount of the cobalt hydroxide powder to be added to the nickel hydroxide powder is 3 mol % to 14 mol %.

It is believed that when the cobalt hydroxide powder is less than 3 mol %, the high-order cobalt compound layers are not formed successfully due to the lack of the cobalt hydroxide, whereas when the amount exceeds 14 mol %, the small ratio of the nickel hydroxide to the active material has a more effect on the capacity than on the formation of the high-order cobalt compound layers.

It is believed that when layers made from a cobalt compound other than cobalt hydroxide are formed over the surfaces of the nickel hydroxide powder, its preferable amount is also 3 mol % to 14 mol %.

Experiment 4

(the relationship between the concentration of alkali for use in alkali heat treatment and the utilization factor of active material)

Using the same manufacturing formula as the active material a1 of the first embodiment, five different active materials were manufactured by varying the concentration of the sodium hydroxide aqueous solution when the alkali heat treatment was applied. Then, five different nickel electrodes were manufactured by using these active materials, respectively. Then, the utilization factor of the active material of each electrode was measured in the same manner as in the second experiment. The calculated results are shown in Table 5 and FIG. 6.

TABLE 5

| CONCENTRATION OF NaOH (wt %) | UTILIZATION FACTOR OF ACTIVE MATERIAL (%) |
|---|---|
| 10 | 81.2 |
| 15 | 89.8 |
| 25 | 92.9 |
| 40 | 90.2 |
| 45 | 80.2 |

Using the same manufacturing formula as the active material b1 of the second embodiment, five different active materials were manufactured by varying the concentration of the sodium hydroxide aqueous solution when the alkali heat treatment was applied. Then, five different nickel electrodes were manufactured by using these active materials, respectively. Then, the utilization factor of the active material of each electrode was measured in the same manner as in the second experiment. The calculated results are shown in Table 6 and FIG. 7.

TABLE 6

| CONCENTRATION OF NaOH (wt %) | UTILIZATION FACTOR OF ACTIVE MATERIAL (%) |
|---|---|
| 10 | 82.2 |
| 15 | 89.9 |
| 25 | 93.4 |
| 40 | 90.5 |
| 45 | 81.6 |

Figure 6:
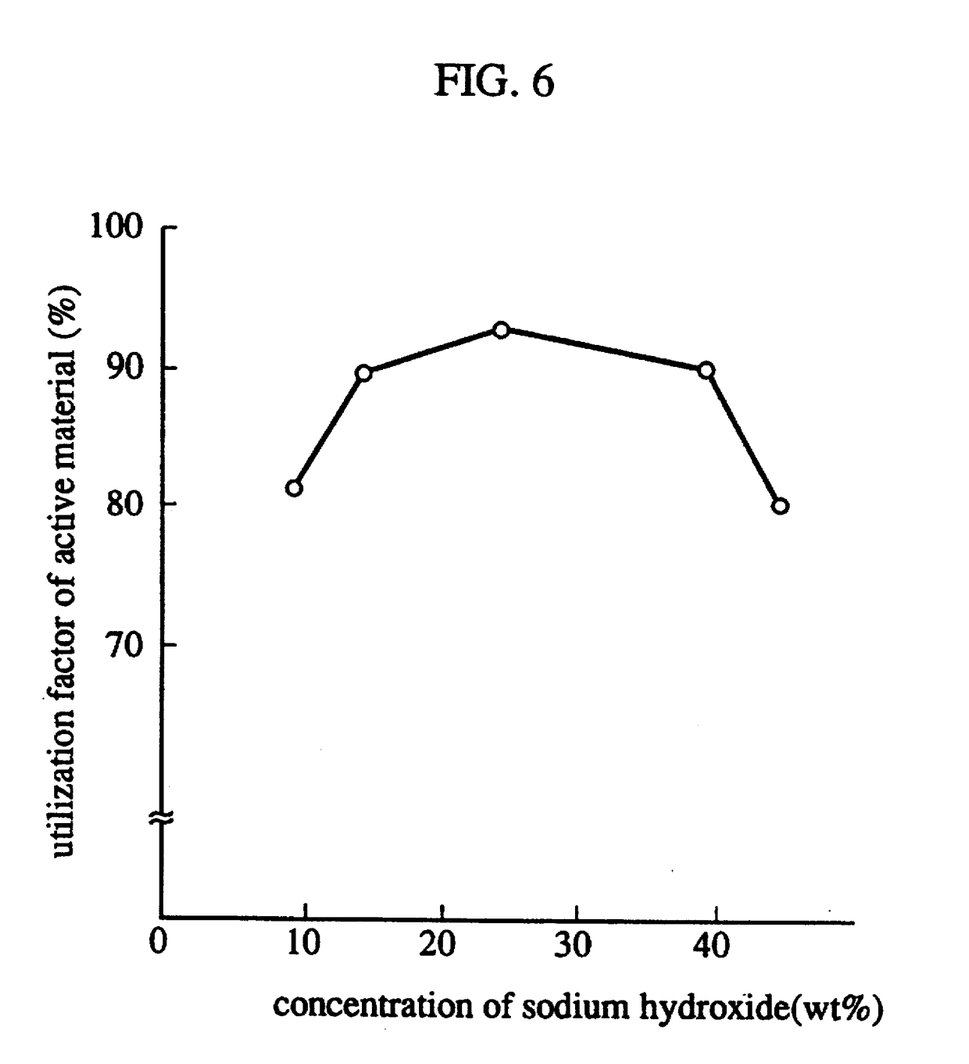
FIGS. 6 and 7 are graphs showing the results of the fourth experiment: the relationship between the concentration of a sodium hydroxide aqueous solution to be used in alkali heat treatment and the utilization factor of the active materials.
Figure 7:
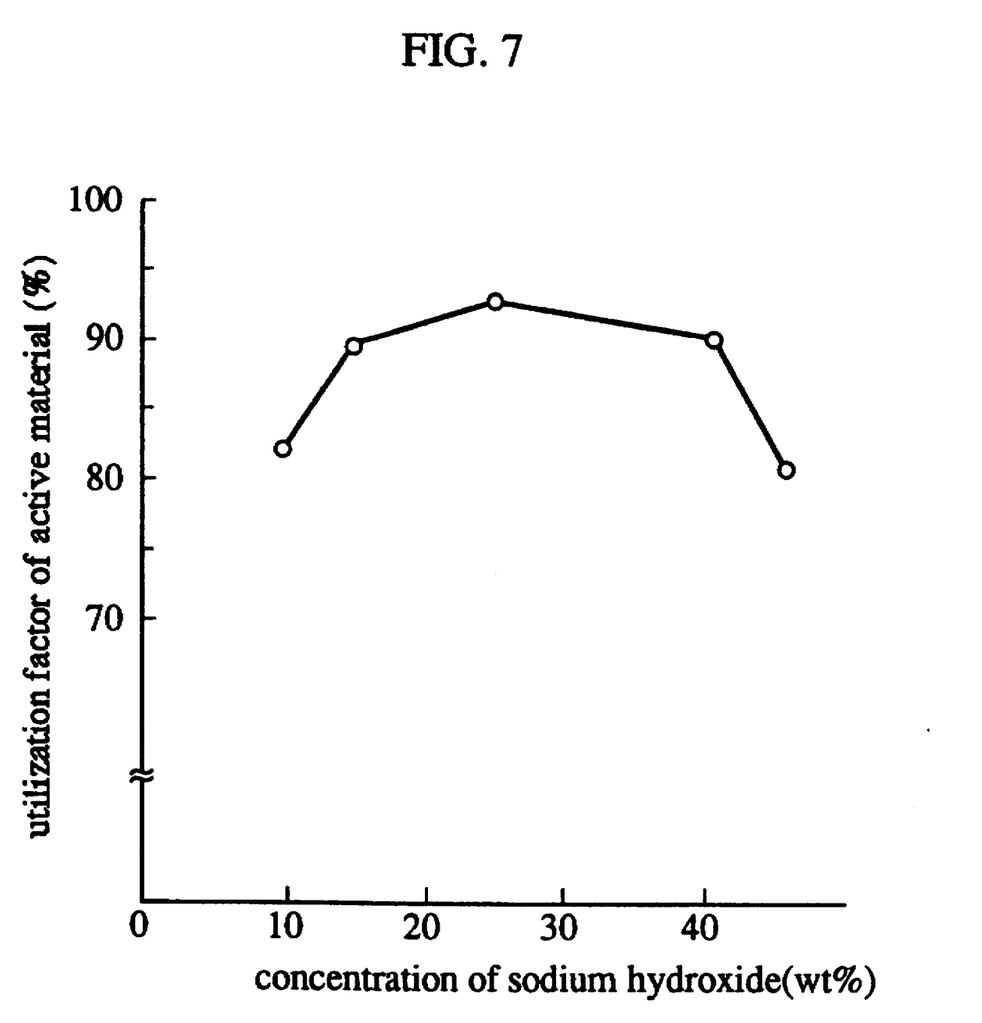

Tables 5 and 6 and FIGS. 6 and 7 indicate that the preferable concentration of the alkali aqueous solution to be used for the alkali heat treatment is 15 mol % to 40 mol % in any of the nickel electrodes.

It is believed that when the concentration of the sodium hydroxide aqueous solution is less than 15 mol %, the solubility of the cobalt hydroxide in the sodium hydroxide aqueous solution is insufficient, and as a result, the effects of the alkali heat treatment become insufficient, whereas when the concentration exceeds 40 mol %, the excessive viscosity of the sodium hydroxide aqueous solution decreases its permeability to the mixture powder particles, and as a result, the effects of the alkali heat treatment become insufficient.

Experiment 5

(the relationship between the temperature of alkali heat treatment and the utilization factor per unit active material)

Using the same manufacturing formula as the active material a1 of the first embodiment, five different active materials were manufactured by varying the temperature of the alkali heat treatment. Then, five different nickel electrodes were manufactured by using these active materials, respectively. Then, the utilization factor of the active material of each electrode was measured in the same manner as in the second experiment. The calculated results are shown in Table 7 and FIG. 8.

TABLE 7

| TEMPERATURE OF HEAT TREATMENT (°C.) | UTILIZATION FACTOR OF ACTIVE MATERIAL (%) |
|---|---|
| 25 | 80.5 |
| 50 | 90.7 |
| 100 | 92.9 |
| 150 | 91.4 |
| 175 | 70.5 |

Using the same manufacturing formula as the active material b1 of the second embodiment, five different active materials were manufactured by varying the temperature of the alkali heat treatment. Then, five different nickel electrodes were manufactured by using these active materials, respectively. Then, the utilization factor of the active material of each electrode was measured in the same manner as in the second experiment. The calculated results are shown in Table 8 and FIG. 9

TABLE 8

| TEMPERATURE OF HEAT TREATMENT (°C.) | UTILIZATION FACTOR OF ACTIVE MATERIAL (%) |
|---|---|
| 25 | 81.5 |
| 50 | 91.3 |
| 100 | 93.4 |
| 150 | 92.6 |
| 175 | 72.5 |

Figure 8:
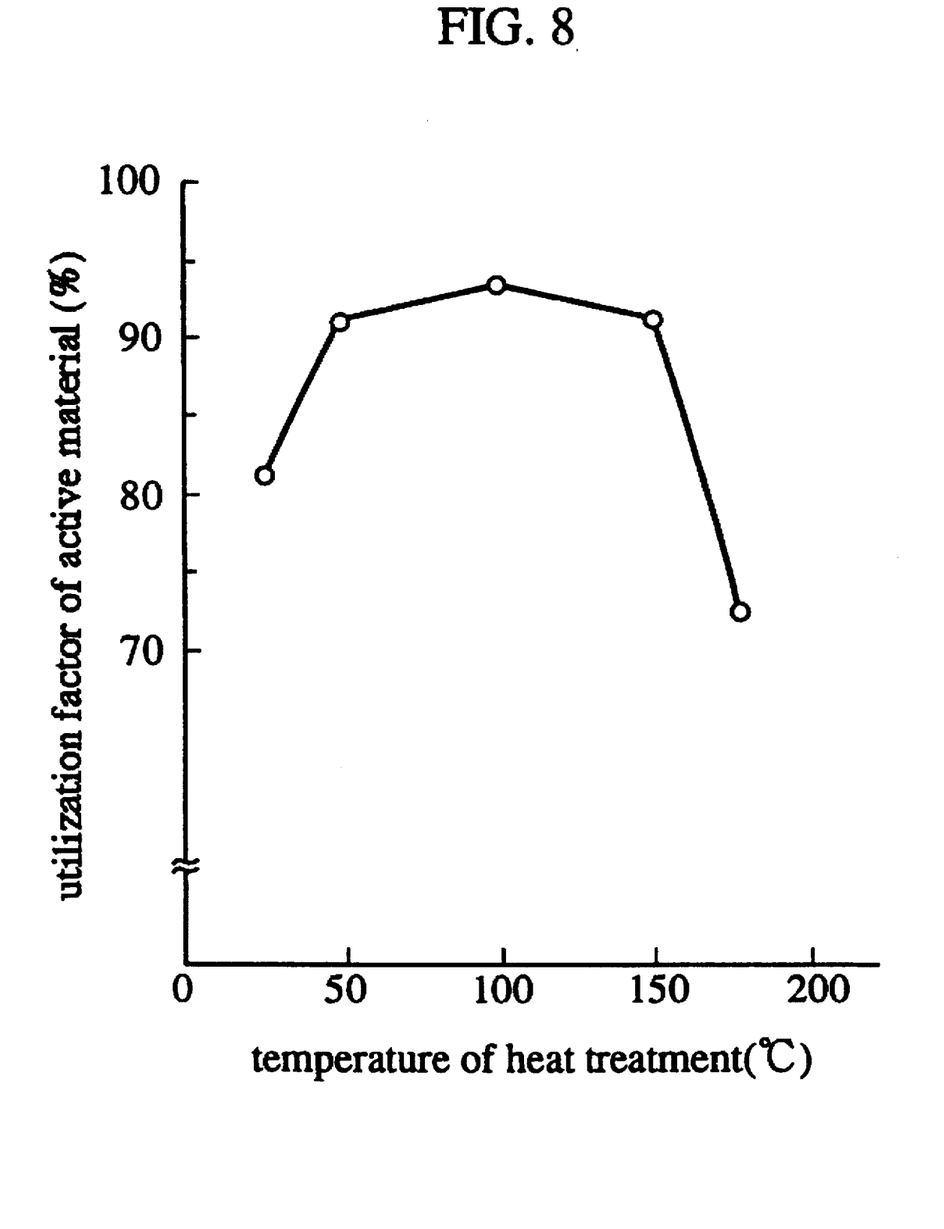
FIGS. 8 and 9 are graphs showing the results of the fifth experiment: the relationship between the temperature of alkali heat treatment and the utilization factor of the active materials.
Figure 9:
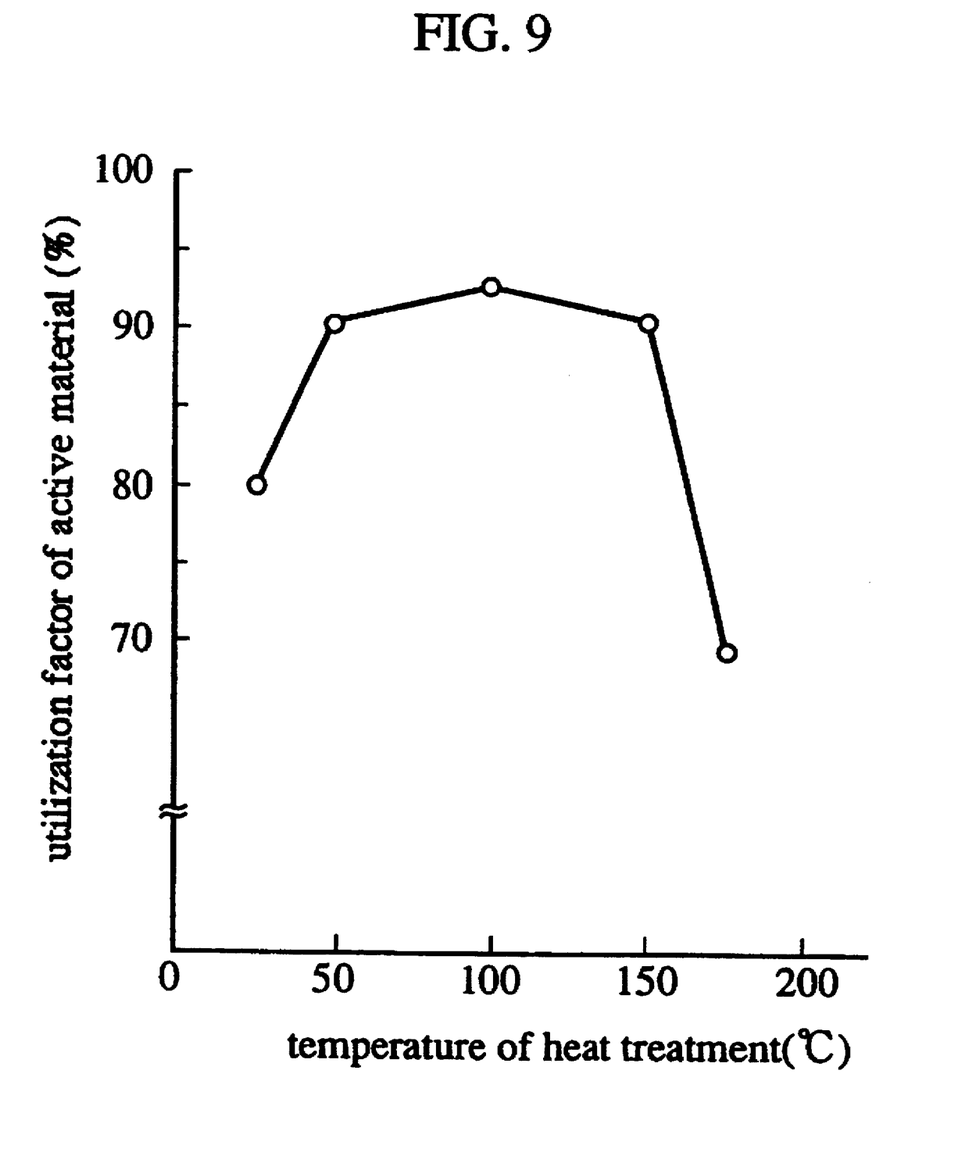

Tables 7 and 8 and FIGS. 8 and 9 indicate that the preferable temperature of the alkali heat treatment is 50° C. to 150° C. in any of the nickel electrodes.

It is believed that when the temperature of the alkali heat treatment is below 50° C., the solubility of the cobalt hydroxide in alkali is low, and as a result, the effects of the alkali heat treatment are not sufficient, whereas when the temperature is over 150° C., the crystal structure of the nickel hydroxide itself is changed.

Experiment 6

(the relationship between the state of zinc to be added and the high-temperature charge characteristics)

The high-temperature charge characteristics of each of the cells (A8) and (A9) of the third embodiment were measured under the following conditions.

A charging operation was carried out for 16 hours at a current of 0.1 C (120 mA) at a temperature of either 25° C., 40° C., or 60° C., and suspended for 3 hours at 25° C. Then, a discharging operation was carried out at a current of 1 C until the discharge termination voltage of 1 V was attained, and their discharge capacities were measured. The ratio of the discharge capacity obtained at 40° C. and 60° C. to the discharge capacity obtained at 25° C. which is set at 100% was calculated. The results are shown in Table 9.

TABLE 9

| CELLS | ZINC OXIDE ADDED | DISCHARGE CAPACITY (%) (charge at 40° C.) | DISCHARGE CAPACITY (%) (charge at 60° C.) |
|---|---|---|---|
| $(A_8)$ | YES | 86.1 | 46.9 |
| $(A_9)$ | NO | 82.2 | 42.5 |

The high-temperature charge characteristics of each of the cells (B6) and (B7) of the third embodiment were measured in the same manner as the cells (A8) and (A9) of the third embodiment.

TABLE 10

| CELLS | ZINC OXIDE ADDED | DISCHARGE CAPACITY (%) (charge at 40° C.) | DISCHARGE CAPACITY (%) (charge at 60° C.) |
|---|---|---|---|
| $(B_6)$ | YES | 87.3 | 47.8 |
| $(B_7)$ | NO | 82.9 | 43.7 |

Tables 9 and 10 indicate that the cells (A8) and (B6) are superior to the cells (A9) and (B7) in the high-temperature charge characteristics. The superiority indicates the charge-ability of these cells increases at a high temperature.

It is believed that the increase in the chargeability at a high temperature resulted from the oxygen generation potential during a charging operation having been shifted to be noble due to the presence of zinc oxide in the form of being liberated from the nickel hydroxide.

Experiment 7

(the relationship between pH and the utilization factor of the active material)

Using the same manufacturing formula as the active material b1 of the second embodiment, five different active materials were manufactured by varying the pH when the cobalt compound layers were formed over the surfaces of the nickel hydroxide powder. Then, five different nickel electrodes were manufactured by using these active materials, respectively. Then, the utilization factor of the active material of each electrode was measured in the same manner as in the second experiment. The calculated results are shown in Table 11 and FIG. 10.

TABLE 11

| pH OF NaOH AQUEOUS SOLUTION | UTILIZATION FACTOR OF ACTIVE MATERIAL (%) |
|---|---|
| 7.5 | 78.5 |
| 8.0 | 92.1 |
| 10.0 | 93.4 |
| 12.0 | 91.8 |
| 12.5 | 72.5 |

Figure 10:
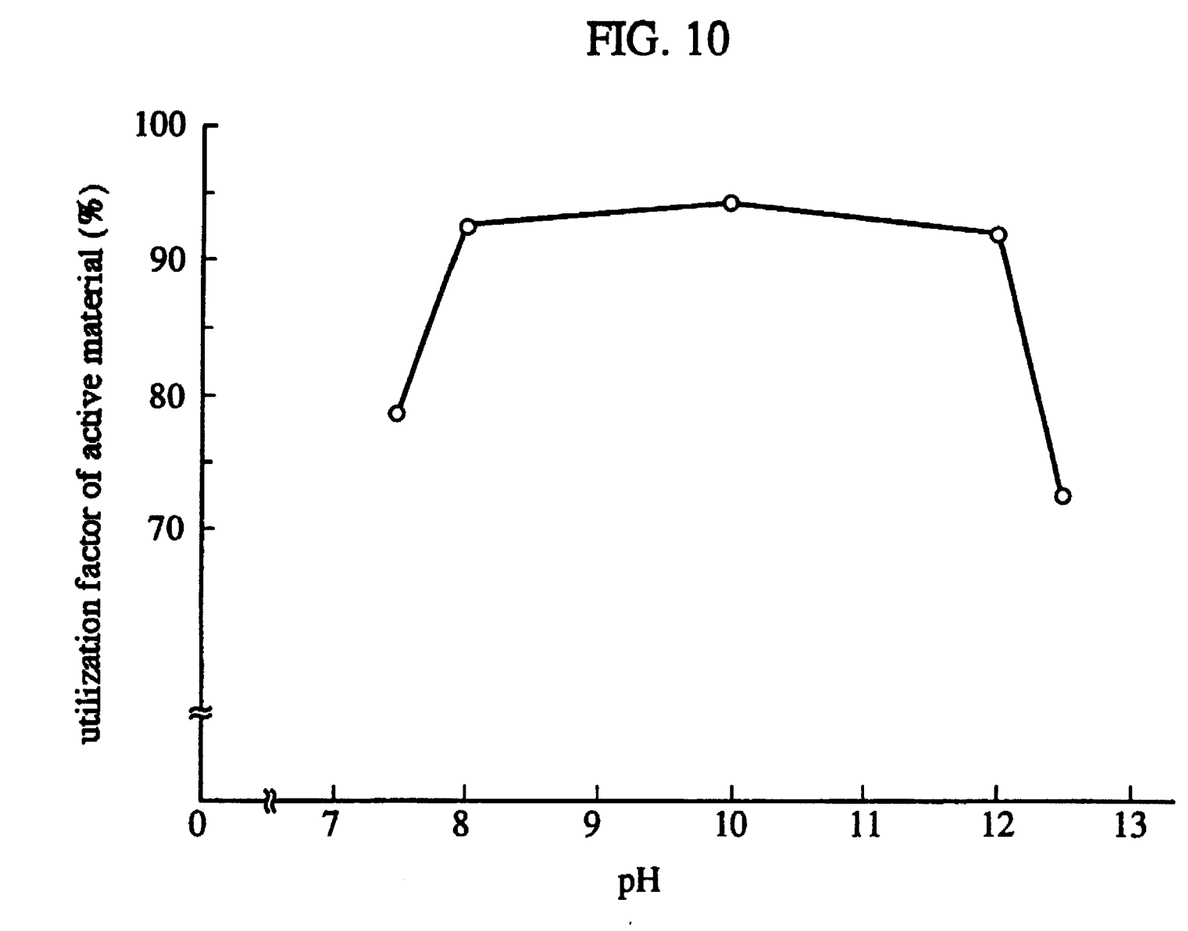
FIG. 10 is a graph showing the results of the seventh experiment: the relationship between the pH when cobalt compound layers are formed and the utilization factor of the active materials.

Table 11 and FIG. 10 indicate that the preferable pH when the cobalt compound layers are formed is 8.0 to 12.0.

It is believed that the precipitation of the cobalt compound proceeds gradually and continuously in the vicinity of the surfaces of the nickel hydroxide particles, and as a result, uniform coating layers are formed when the pH is within the range. In contrast, such circumstances suitable for the precipitation cannot be generated outside the range.

It is further believed that the precipitation proceeds too rapid to form uniform coating layers when the pH is over 12.0.

(Others)

Although the aforementioned experiments 2–7 were conducted by using the nickel hydroxide in which zinc was added as a solid solution, the same results would be obtained when at least one of zinc, cadmium, magnesium, and calcium in the form of a solid solution is added to the nickel hydroxide.

Although a sodium hydroxide aqueous solution was used in the alkali heat treatment in the embodiments, the same results would be obtained when one of a potassium hydroxide aqueous solution, a sodium hydroxide aqueous solution which contains LiOH, and a potassium hydroxide aqueous solution which contains LiOH is used. In either case, a preferable concentration of the alkali aqueous solution would be 15% by weight to 40% by weight, and a preferable temperature of the alkali heat treatment would be 50° C. to 150° C. like the aforementioned experiments.

Although the nickel electrodes of the embodiments were manufactured by filling foam nickel with an active material, they may be manufactured by applying an active material onto an electrode substrate such as a punching metal to obtain the same effects.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A method of manufacturing a non-sintered nickel electrode for use in an alkali storage cell, said method comprising the steps of:

precipitating cobalt compound layers on surfaces of nickel hydroxide powder in which at least one of zinc, cadmium, magnesium, and calcium is added in a form of a solid solution, by adding an acid solution in which cobalt compounds are dissolved and an alkali solution into a solution in which the nickel hydroxide powder is dispersed, subjecting the powder to a heat treatment in a presence of a oxygen and alkali so that the cobalt compound layer has a disordered crystal structure and an oxidation number higher than +2, and applying the powder subjected to the heat treatment to an active material supporter.

2. The method of claim 1, wherein the precipitation of the cobalt compound is conducted by dispersing the nickel hydroxide into a cobalt salt aqueous solution with a pH being adjusted to between 8.0 and 12.0.

3. The method of claim 1, wherein the cobalt compound layers contain cobalt of 3 mol % to 14 mol % to the nickel hydroxide.

4. The method of claim 1, wherein the alkali is an alkali aqueous solution of 15% by weight to 40% by weight.

5. The method of claim 1, wherein the alkali contains lithium ions.

6. The method of claim 1, wherein the heat treatment is conducted at a temperature of 50° C. to 150° C.

7. The method of claim 1, wherein the active material supporter holds at least one of second zinc, a zinc compound, second cadmium, and a cadmium compound in addition to the powder.

* * * * *